(12) United States Patent
Salmon et al.

(10) Patent No.: US 7,194,559 B2
(45) Date of Patent: Mar. 20, 2007

(54) SLAVE I/O DRIVER CALIBRATION USING ERROR-NULLING MASTER REFERENCE

(75) Inventors: Joseph H. Salmon, Placerville, CA (US); Hing Y. To, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 725 days.

(21) Appl. No.: 10/231,863

(22) Filed: Aug. 29, 2002

(65) Prior Publication Data

US 2004/0044808 A1 Mar. 4, 2004

(51) Int. Cl.
*G06F 3/00* (2006.01)
*G06F 17/50* (2006.01)

(52) U.S. Cl. ............. 710/8; 710/9; 710/10; 716/1; 716/14; 327/108; 362/230.3; 702/107

(58) Field of Classification Search ............. 710/8–10; 716/1, 14; 327/108; 362/230.3; 702/107
See application file for complete search history.

(56) References Cited

U.S. PATENT DOCUMENTS 5,666,078 A * 9/1997 Lamphier et al. ............ 327/108
6,085,033 A * 7/2000 Starr et al. ..................... 716/14
6,087,847 A * 7/2000 Mooney et al. ................ 326/30
6,292,407 B1 * 9/2001 Porter et al. ............ 365/189.11
6,807,650 B2 * 10/2004 Lamb et al. ..................... 716/1

OTHER PUBLICATIONS

*DDR-II SDRAM, OCD Impedance Adjustment*; JEDEC; Nov. 2, 1999, pp. 2-6.

* cited by examiner

*Primary Examiner*—Tammara Peyton
(74) *Attorney, Agent, or Firm*—Marger Johnson & McCollom P.C.

(57) ABSTRACT

Methods and devices for calibrating a driver on a slave device, using a master device driver as a load, are disclosed. A master reference driver is integrated on the same circuit as the master device driver, with both drivers having the same layout and geometry. The master reference driver is calibrated using a selected load impedance that includes the nominal slave device driver impedance and any other impedance elements. The same calibrated driver setting is concurrently applied to both the master driver and the master reference driver, while the slave device drives the master driver. The voltage at the master driver is compared to the voltage at the master reference driver, and the slave device driver impedance is adjusted until those voltages match. The resulting calibration of the slave device driver impedance is largely independent of the actual impedance of the master device driver.

14 Claims, 5 Drawing Sheets

SLAVE I/O DRIVER CALIBRATION USING ERROR-NULLING MASTER REFERENCE

FIELD OF THE INVENTION

This present invention relates generally to semiconductor devices and systems, and more particularly to signal driver calibration for such devices and systems.

BACKGROUND

Many semiconductor devices are designed to intercommunicate with other semiconductor devices over digital buses. Such devices incorporate drivers to drive digital signals on a bus, and receivers to receive signals driven by other devices on the bus.

As integrated circuit operating voltages decrease—while bus clock speeds increase—it becomes increasingly difficult to drive bus signals in a manner that allows them to be received without errors introduced by noise, reflections, framing errors, etc. Accordingly, impedance matching of bus signaling components is not only desirable, but may be required for some high-speed, low-voltage buses are to work reliably.

Many schemes exist for calibrating driver circuitry, e.g., to achieve a specified drive strength (drive strength is often characterized by an on-resistance "$R_{on}$", which, for a field-effect transistor, is a ratio of source-drain voltage to driver current at a given source-drain voltage). Most calibration schemes work by connecting the driver to a known load, and then adjusting the drive strength until a known voltage is achieved at a designated point in the driver/load path. A self-calibrating circuit typically measures for the known voltage itself. A circuit can also calibrate its drivers by cooperating with a remote circuit that measures a remote voltage and issues driver calibration instructions to the first circuit.

A cooperative calibration scheme has been proposed for DDR-II (Double Data Rate-II) SDRAM (Synchronous Dynamic Random Access Memory) devices. This scheme is known as the Off-Chip Driver (OCD) Impedance Adjustment Protocol, and is described in a document entitled "DDR-II SDRAM: OCD Impedance Adjustment", dated Nov. 2, 1999. The OCD protocol defines a command that can be issued by a memory controller to a memory device. This command causes the memory device to enter an OCD Impedance Adjustment mode. This mode causes the memory device to reset its driver to a nominal impedance, and then respond to commands from the memory controller to increase or decrease its driver impedance.

Figure 1:
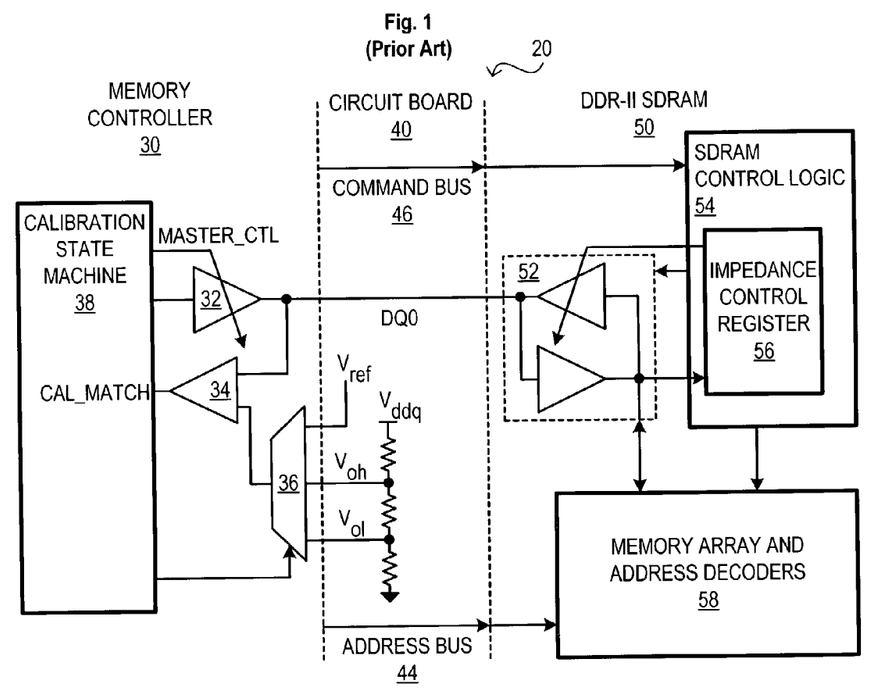
FIG. 1 illustrates a prior art memory controller/memory device configuration that uses the OCD calibration protocol.

FIG. 1 shows one calibration configuration 20 envisioned by the drafters of the OCD Impedance Adjustment Protocol. A memory controller 30 communicates with a DDR-II SDRAM device 50 over a bi-directional data bus (one bus line DQ0 is shown) and a unidirectional address/command bus (44 and 46). Controller 30 and device 50 both connect to circuit board 40, which contains bus traces as well as other connections (power, clocks, etc.) used by the circuits.

Memory controller 30 contains a master driver 32, a comparator 34, a multiplexer 36, and a calibration state machine 38. State machine 38 uses MASTER_CTL to set the impedance of master driver 32. Comparator 34 supplies a calibration match signal CAL_MATCH to state machine 38. CAL_MATCH is used to sense whether the voltage on DQ0 matches a voltage supplied by multiplexer 36. State machine 38 sets multiplexer 36 to pass one of three reference voltages, $V_{oh}$, $V_{ol}$, and $V_{ref}$ to comparator 34, depending on the comparison to be performed.

SDRAM device 50 contains an I/O driver 52 that connects to DQ0. SDRAM control logic 54 receives commands from memory controller 30 over command bus 46. Depending on the command received, some possible operations are a transfer of data from I/O driver 52 to memory array 58 (a write operation), a transfer of data from memory array 58 to I/O driver 52 (a read operation), and a transfer of data from I/O driver 52 to impedance control register 56 (an OCD operation). During a read operation, impedance control register 56 sets the impedance of I/O driver 52 according to the current value held in register 56.

The OCD Impedance Adjustment Protocol explains several methods for calibrating the drivers in system 20. The master driver must be calibrated first. Although master driver calibration is not explained in detail, two methods are prevalent. First, the master driver can be calibrated at the factory, with the appropriate driver settings stored in non-volatile (e.g., fuse-based) registers on the master circuit. Second, a calibration load can be connected from a $V_{ddq}/2$ voltage reference to a spare master driver for purposes of calibration. The calibration setting for the spare driver is then propagated to the master driver.

With the master driver 32 calibrated, controller 30 uses the OCD Impedance Adjustment Protocol to set the impedance of I/O driver 52. SDRAM 50 is instructed to reset its impedance control register 56 and accept OCD commands. State machine 38 then drives DQ0 low, using the previously calibrated pull-down impedance for driver 32. Controller 32 instructs SDRAM 50 to attempt to drive DQ0 high. While this instruction is active, comparator 34 compares the voltage on DQ0 to $V_{ref}$ (usually set halfway between the supply voltage $V_{ddq}$ and ground). Controller 32 then issues a command to SDRAM 50 to raise or lower the pull-up impedance of driver 52 as appropriate, reissues the read command, and compares the voltages again—this process continues until driver 52's pull-up impedance matches master driver 32's pull-down impedance. This entire process is duplicated to calibrate driver 52's pull-down impedance against master driver 32's pull-up impedance.

BRIEF DESCRIPTION OF THE DRAWING

The embodiments may be best understood by reading the disclosure with reference to the drawing, wherein.

DETAILED DESCRIPTION OF THE EMBODIMENTS

The prior art methodology for calibrating a slave driver using a master driver as a load introduces several possible sources of significant calibration error. First, the master driver impedance is itself set using some sort of a reference load—as the impedance of this load can be far from an exact known quantity, any error in this load affects the calibration of the master driver. Such an error propagates directly to all slave drivers during the OCD calibration process.

Second, the master driver impedance is stored as a digital value, with a relatively small number of possible values. Thus even if the comparison impedance is exact, the calibrated master driver impedance may not be exact due to quantization error. Any quantization error in the master driver impedance can also cause errors in the calibrated slave driver impedance.

Figure 2:
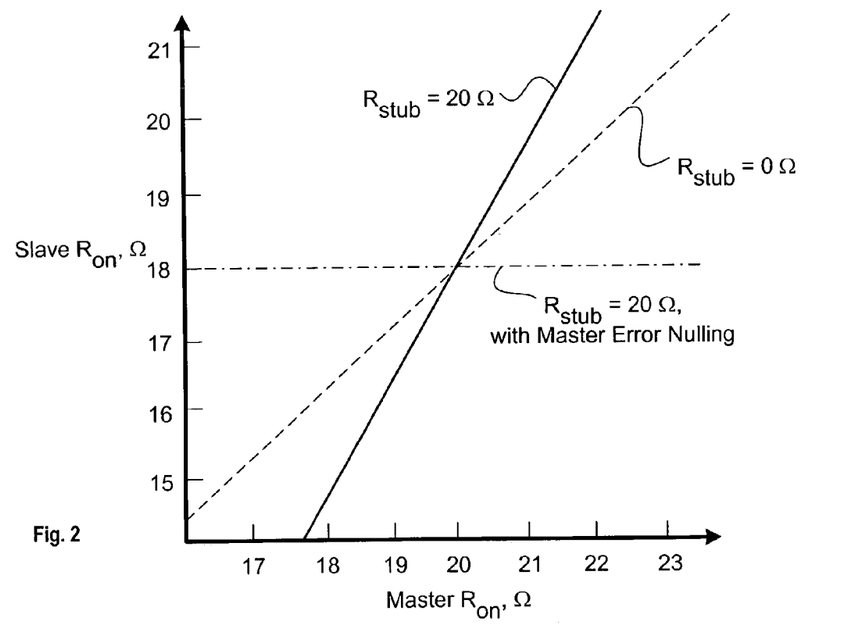
FIG. 2 shows the sensitivity of slave driver calibrated $R_{on}$ to errors in master driver $R_{on}$, for an OCD-type calibration over a data line: having no stub resistor; having a stub resistor; and having a stub resistor but functioning according to some embodiments described herein.

These effects can be exacerbated by the placement of other impedance elements, e.g., stub resistors, in the DQ0 signal path. Without the stub resistance, an error in calibrated master driver $R_{on}$ creates a directly proportional error in calibrated slave driver $R_{on}$ (see FIG. 2, plot for $R_{stub}$=0). But with a 20 Ω stub resistance inserted in the DQ0 serial path, errors in the master driver $R_{on}$ are amplified. As shown in FIG. 2 for $R_{stub}$=20 Ω, a 1 Ω (5%) master driver $R_{on}$ error translates to a 1.9 Ω (10.6%) slave driver $R_{on}$ error (FIG. 2 does not show the effect of a stub resistance error, which would shift the plotted curves up or down proportionally). With master driver calibration and quantization errors factored in, OCD impedance adjustment for some such systems could not be guaranteed to achieve an acceptable calibrated slave driver impedance.

Such calibration systems can be characterized by simple equations (ignoring error sources other than the resistance values themselves). Where $R_M$ is the master driver on-impedance, $R_S$ is the slave driver on-impedance, $R_{DQ}$ is the stub resistance, and an (*) on a resistance indicates an ideal resistance, the following equation holds for pull-up slave driver calibration from a pull-down master driver:

$$V_{ddq} \frac{R_M}{R_M + R_S + R_{DQ}} = V_{ref} = V_{ddq} \frac{R_M^*}{R_M^* + R_S^* + R_{DQ}^*} \quad (1)$$

Solving for the slave driver on-impedance $R_S$, it can be seen how the presence of stub resistance—in conjunction with master driver on-impedance error—can magnify errors in calibrated slave driver on-impedance:

$$R_S = \frac{R_M}{R_M^*}(R_S^* + R_{DQ}^*) - R_{DQ} \quad (2)$$

The embodiments described herein remove some of the error sources that diminish the attractiveness of an OCD-type impedance adjustment scheme. In these embodiments, the master driver is not calibrated directly. Instead, a matching reference driver—that does not connect to a functional bus line—is calibrated to a target impedance using a reference impedance. The reference impedance approximates a given bus impedance that should exist when a properly calibrated slave device is driving a bus line.

The reference driver impedance, once calibrated, is saved as an impedance register setting. This same impedance register setting is propagated to the master driver or drivers. Particularly for unterminated bus lines, this greatly simplifies the task of calibrating the master driver accurately.

Even with the master driver set as accurately as possible using the method above, impedance-adjustment quantization error can cause the master driver to present less than a perfect reference load for setting a slave driver. The described embodiments are capable of effectively nulling such errors. Instead of comparing the bus line voltage to an "ideal" reference voltage during slave driver calibration, the bus line voltage is compared against the reference driver line voltage. During this process, the master driver and reference driver use the same impedance-adjustment setting. Since the same quantization error appears in both driver settings, the slave driver is, in effect, being matched against the same reference impedance used to calibrate the master driver and is largely independent of the impedance setting of the master driver.

Figure 3:
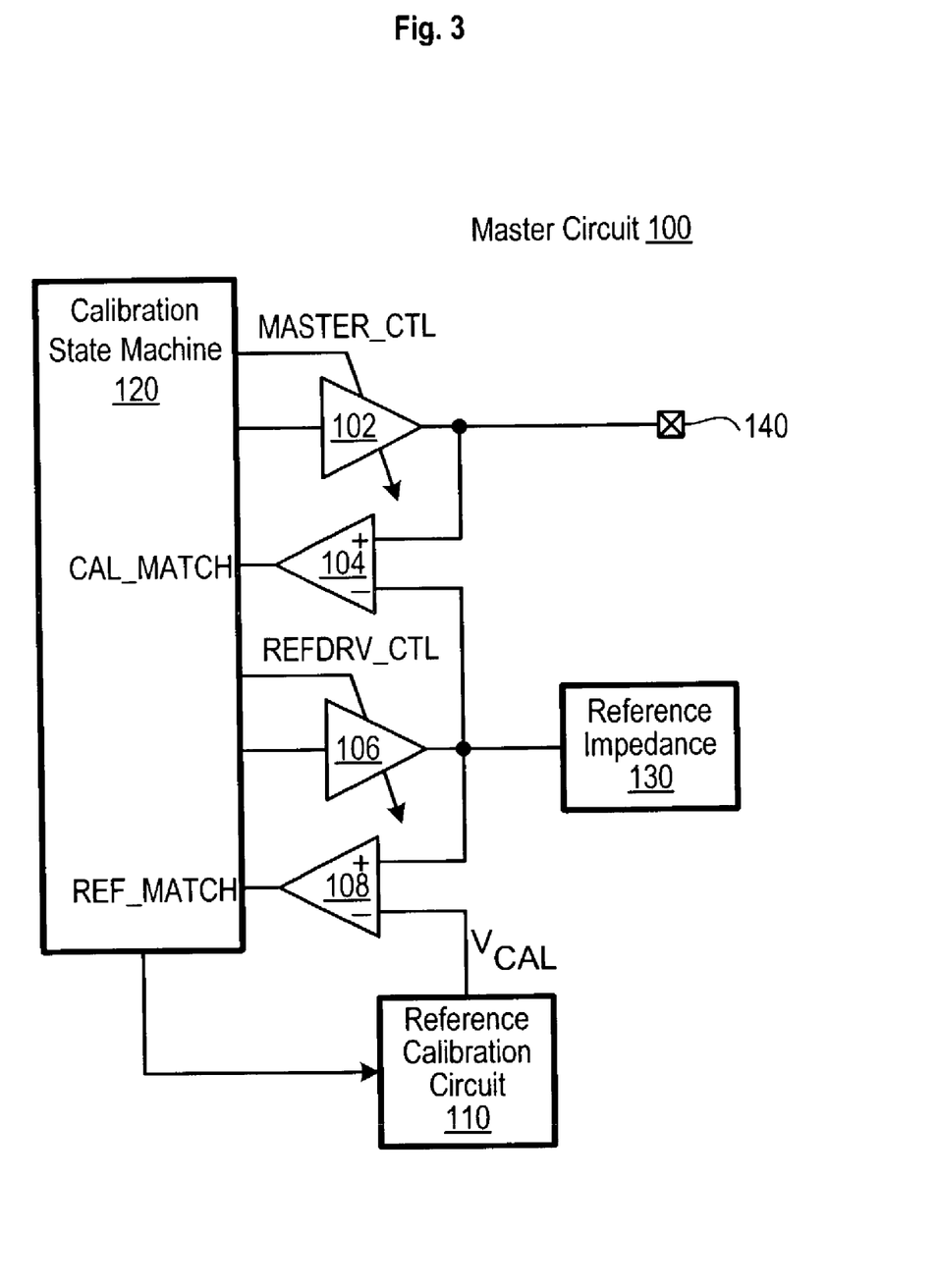
FIG. 3 illustrates a block diagram for master circuitry according to some embodiments.

FIG. 3 shows, in block diagram form, a master circuit 100 according to one embodiment of the present invention. A calibration state machine 120 controls a master driver 102, a reference driver 106, and a reference calibration circuit 110. Preferably, master driver 102 and reference driver 106 have identical circuit geometries and layout. The MASTER_CTL signal sets the impedance of master driver 102, and the REFDRV_CTL signal sets the impedance of reference driver 106.

Two comparators 104 and 108 are used for calibration. Comparator 108 compares the voltage generated by reference calibration circuit 110 to the output voltage of reference driver 106 (reference calibration circuit 110 generates an "ideal" calibration voltage reference $V_{CAL}$). Comparator output REF_MATCH supplies state machine 120 with an indication of the match success.

Comparator 104 compares the output voltage of master driver 102 to the output voltage of reference driver 106. Comparator output CAL_MATCH supplies state machine 120 with an indication of the match success.

The output of master driver 102 is connected to a bus attachment point 140. The output of reference driver 106 attaches to a reference impedance 130. Reference impedance 130 approximates the bus line impedance that should exist at attachment point 140 when a bus is attached to attachment point 140 and a properly calibrated remote driver (not shown) is driving the bus line. The reference impedance will typically be implemented using one or more circuit-board-mounted precision resistors, as illustrated in the following example.

Figure 4:
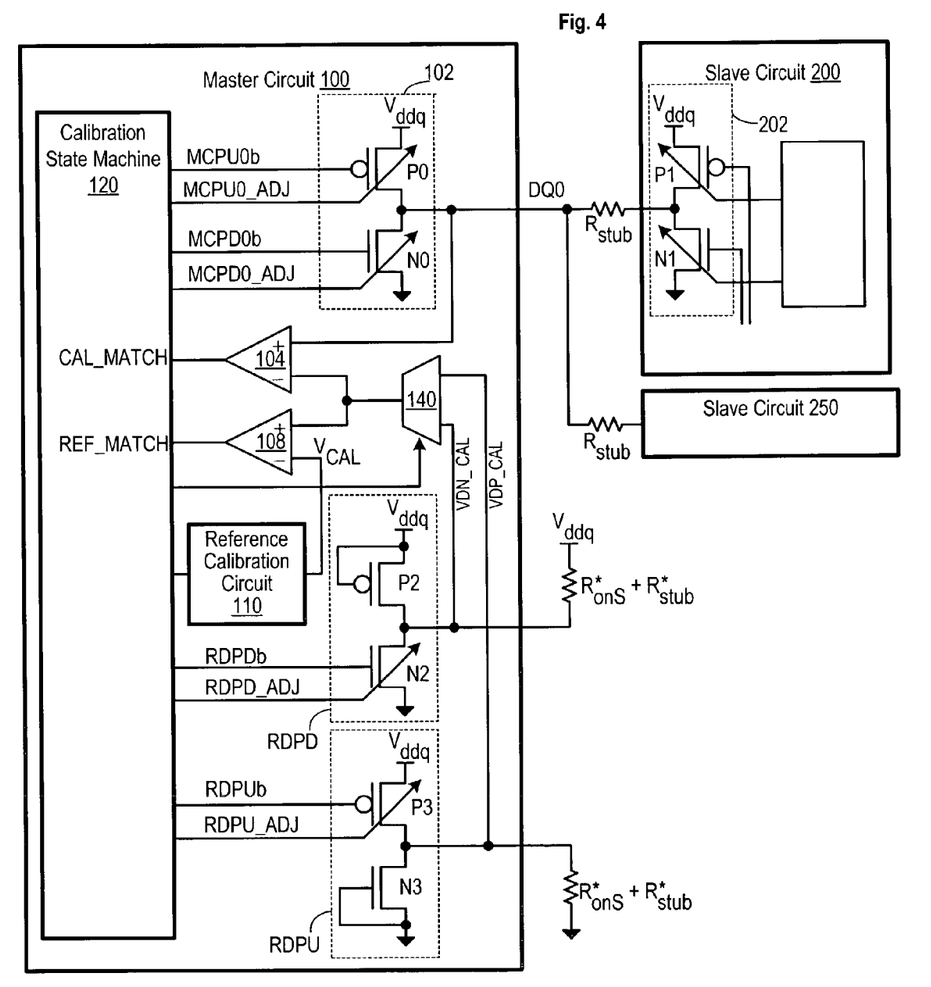
FIG. 4 illustrates a system including master circuitry according to some embodiments, a bus line, and two slave circuits.

FIG. 4 shows a CMOS (Complementary Metal-Oxide-Semiconductor) driver implementation of a master circuit 100, connected to a CMOS driver implementation of a slave circuit 200 by a bus line DQ0. DQ0 connects to master driver 102 on master circuit 100, and connects to slave driver 202 on slave circuit 200. In some embodiments, DQ0 will have multiple line drops for multiple slave circuits (one additional slave circuit 250 is shown). Each slave circuit connects to DQ0 through a stub resistor $R_{stub}$ (some designs, such as double-sided DIMMs, can share a single stub resistor between two slave circuits with DQ connections in close proximity).

Master driver 102 comprises an adjustable-impedance P-channel driver P0 and an adjustable-impedance N-channel driver N0. P0 has its source node connected to $V_{ddq}$, N0 has its source node connected to ground, and both P0 and N0 have their drain nodes connected to DQ0. The gate node of P0 is driven by MCPU0b (master circuit pull-up, DQ0), and the $R_{on}$ of P0 is set by MCPU0_ADJ. The gate node of N0 is driven by MCPD0b (master circuit pull-down, DQ0) and the $R_{on}$ of N0 is set by MCPD0_ADJ.

Master circuit 100 contains two other drivers as shown, pull-down reference driver RDPD and pull-up reference driver RDPU. Pull-down reference driver RDPD, like master driver 102, has an adjustable N-channel driver (N2) with a grounded source. Although a pull-up device P2 is shown as part of reference driver RDPD, the gate and source of P2 are tied permanently high—thus P2 is normally biased off and serves primarily an ESD (electrostatic discharge) protection function. Pull-up reference driver RDPU is just the opposite, having an adjustable P-channel driver P3 referenced to $V_{ddq}$ and an off-biased N-channel device N3.

Each of the reference drivers is controlled by calibration state machine 120. The gate signals RDPDb and RDPUb, when asserted, turn on drivers RDPD and RDPU, respectively. The $R_{on}$ of drivers RDPD and RDPU are set, respectively, by RDPD_ADJ and RDPU_ADJ.

Each reference driver generates a reference voltage at its drain node—RDPD generates a reference voltage VDN_CAL, and RDPU generates a reference voltage VDP_CAL.

Each reference driver has its drain node connected through an external reference impedance to an appropriate reference voltage. The reference impedance is selected equal to a nominal DQ0 calibration load. For instance, with $R^*_{stub}$ being the nominal DQ0 stub resistor value, and $R^*_{onS}$ defined as the target on-impedance for the slave driver, the reference impedance is selected as $R^*_{stub}+R^*_{ons}$ Ω. For pull-down reference driver RDPD, this resistance is connected between the driver output and $V_{ddq}$; for pull-up reference driver RDPU, a similar resistance is connected between the driver output and ground.

The two reference drivers feed their output voltages to multiplexer 140. Calibration state machine 120 selects one of these two voltages to pass through to comparators 104 and 108. Comparator 104 compares the multiplexer output voltage to the voltage on DQ0 and generates a signal CAL_MATCH. Comparator 108 compares the multiplexer output voltage to $V_{CAL}$, a calibration voltage generated by reference calibration circuit 110.

Figure 5:
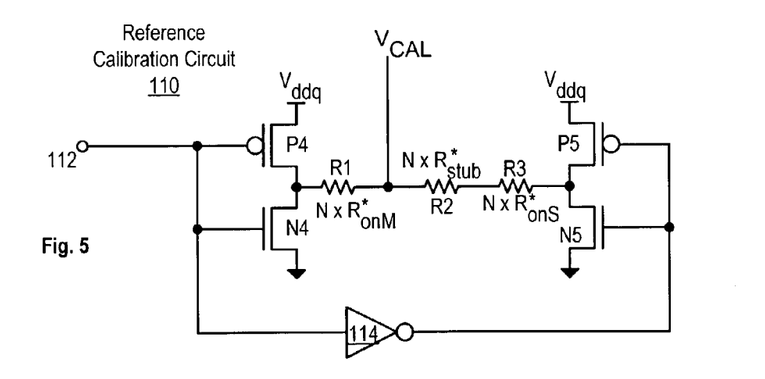
FIG. 5 illustrates a reference calibration circuit useful with some embodiments of the invention.

FIG. 5 shows one embodiment for reference calibration circuit 110. Three central resistors R1, R2, R3 are connected serially to form a resistive voltage divider network. R1 is proportional, by a factor N, to the nominal master driver on-impedance $R^*_{onM}$. R2 is proportional, by the same factor N, to the nominal data line stub impedance $R^*_{stub}$. And R3 is proportional, by the same factor N, to the nominal slave driver on-impedance $R^*_{onS}$. N is not critical, and thus calibration circuit 110 can tolerate normal resistivity variances that arise during fabrication. N should be large enough, however, that the resistance of the switching transistors negligibly affects the output voltage.

Four switching transistors P4, N4, P5, N5 control the direction of current flow through R1, R2, R3. The drains of P4 and N4 connect to the open end of R1; the drains of P5 and N5 connect to the open end of R3. When N4 and P5 are turned on, current flows right to left through the voltage divider network. When P4 and N5 are turned on, current flows left to right through the voltage divider network.

Calibration state machine 120 controls the switching transistors by injecting appropriate signaling at node 112. The signal at node 112 directly controls the gates of P4 and N4. The signal at node 112 is also passed to inverter 114—the output of inverter 114 controls the gates of P5 and N5.

When the signal at node 112 is high, current flows right to left through the voltage divider network, simulating a data line condition with the slave driver in pull-up mode and the master driver in pull-down mode. Thus with node 112 high, $V_{CAL}$ can be used to set VDN_CAL to the same voltage, in the process setting N2 to an $R_{on}=R^*_{onM}$. When the signal at node 112 is low, current flows left to right through the voltage divider network, simulating a data line condition with the slave driver in pull-down mode and the master driver in pull-up mode. Thus with node 112 low, $V_{CAL}$ can be used to set VDP_CAL to the same voltage, consequently setting P3 to an $R_{on}=R^*_{onM}$.

Figure 6:
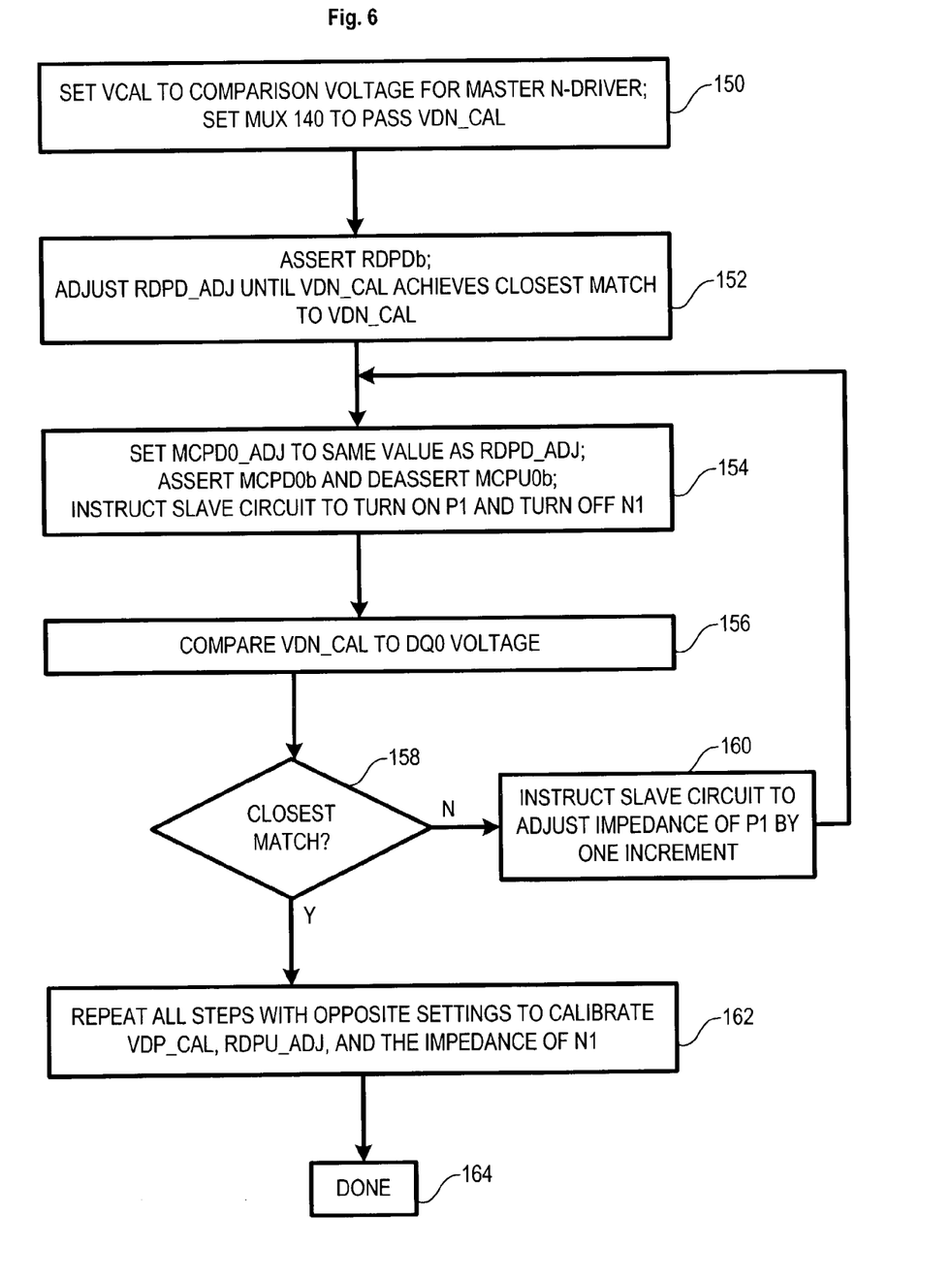
FIG. 6 contains a flowchart for a calibration process according to a method embodiment.

FIG. 6 illustrates a process for setting the $R_{on}$ of master driver 102 and slave driver 202 in FIG. 4. It should be understood that calibration state machine 120 implements a peripheral function of master circuit 100, and will normally only be activated, e.g., at system power-up, upon a manual request, etc. Assuming that state machine 120 has been activated, block 150 illustrates the steps taken to prepare for setting the pull-down reference driver. At block 150, $V_{CAL}$ is set to the comparison voltage needed for calibrating a master N-driver (e.g., by taking node 112 in FIG. 5 to a high logic level). Multiplexer 140 is set to pass VDN_CAL from pull-down reference driver RDPD to comparator 108.

At block 152, RPDPb is asserted to turn on pull-down reference driver RDPD. RDPD_ADJ is then adjusted until REF_MATCH indicates an acceptable match between $V_{CAL}$ and VDN_CAL. For instance, comparator 108 can set REF_MATCH to a high logic level whenever VDN_CAL is greater than $V_{CAL}$, and to a low logic level whenever VDN_CAL is less than $V_{CAL}$. If state machine 120 observes that REF_MATCH is high, it decreases the on-resistance of N2 in steps until REF_MATCH transitions low. If state machine 120 observes that REF_MATCH is low, it increases the on-resistance of N2 in steps until REF_MATCH transitions high. Either the resistance setting just before, or the resistance setting that generates the transition on REF_MATCH, can be selected as the matching value for RDPD_ADJ.

At block 154, the on-resistance of pull-down driver N0 is set to the same value as that calibrated for reference pull-down driver N2, by setting MCPD0_ADJ to the same value as RDPD_ADJ. Master driver 102 is then set to pull-down drive mode by asserting MCPD0b and deasserting MCPU0b (if asserted). RDPDb remains asserted. Master circuit 100 then instructs slave circuit 200 to turn on its pull-up driver P1 and turn off its pull-down driver N1.

At block 156, with the signals remaining as they were at block 154, comparator 104 compares the voltage on DQ0 to VDN_CAL (the output of multiplexer 140). Decision block 158 evaluates the result of the comparison, and determines whether the current voltage comparison is the closest match achievable. If this is the closest match, the process transitions to block 162; otherwise, the process transitions to block 160.

Block 160 is reached whenever the system is still searching for the slave driver pull-up impedance that produces the closest comparison at comparator 104. At block 160, master circuit 100 instructs slave circuit 200 to adjust the impedance of P1. For instance, in one embodiment, comparator 104 produces two logic levels: a low logic level when the voltage at DQ0 is too low (i.e., the resistance of P1 is too high); and a high logic level when the voltage at DQ0 is too high (i.e., the resistance of P1 is too low). Thus one possible instruction requests that slave circuit 200 increment the resistance of P1 by one value, when CAL_MATCH is high, and vice-versa, when CAL_MATCH is low.

Block 160 loops back to block 154, where N0 and P1 are once again turned on—this time with a new value for P1. The comparison of block 156 and match decision of block 158 are performed again.

Once the system has found the closest match of the possible slave driver pull-up impedance values, the process transitions to block 162. Block 162 repeats the process above, but this time calibrates VDP_CAL, RDPU_ADJ, and the impedance of N1. Finally, block 164 indicates, e.g., to the main function of master circuit 100, that the driver impedances have been set, and the main functions can exit the impedance adjustment mode.

Note that an additional loop through the logic of FIG. 4 could be used to set the slave driver (not shown) of slave circuit 250. As the reference drivers need not be re-calibtared, this loop need not repeat the portions of blocks 150 and 152 used to calibrate the reference driver.

Referring back to FIG. 2, a third plot is shown for slave driver calibration as a function of master driver calibration, but with master-driver-error nulling according to the embodiment above. This plot shows no dependence of calibrated slave driver impedance on master driver impedance (ignoring second-order effects and assuming that the slave driver is in a fairly linear operating range). The calibration process stops when the following equation is best satisfied:

$$\frac{R_M}{R_M + R_S + R_{stub}} = \frac{R_{MR}}{R_{MR} + (R_S^* + R_{stub}^*)} \quad (3)$$

where $R_M$ is the calibrated master driver $R_{on}$, $R_{MR}$ is the calibrated master reference driver $R_{on}$, $R_S$ is the calibrated slave driver $R_{on}$, $R_{stub}$ is the actual stub resistor value, and $(R^*_S + R^*_{stub})$ is the reference resistor value. Equation (3) can be simplified and solved for $R_S$ to yield:

$$R_S = \frac{R_M}{R_{MR}}(R_S^* + R_{stub}^*) - R_{stub} \quad (4)$$

But the master driver and master reference driver are virtually identical devices integrated on the same circuit, and are set using the same digital impedance control value. Accordingly, a very good approximation is that $R_M = R_{MR}$. In this case, the remaining error in equation (4) is whatever error exists in the reference and stub resistors. This desirable result allows the target driver on-impedance to be controlled essentially to the accuracy of the reference and stub resistors (although impedance is further constrained to one of the quantization levels represented by the target driver on-impedance control register, such that some target driver on-impedance quantization error is virtually unavoidable).

Figure 7:
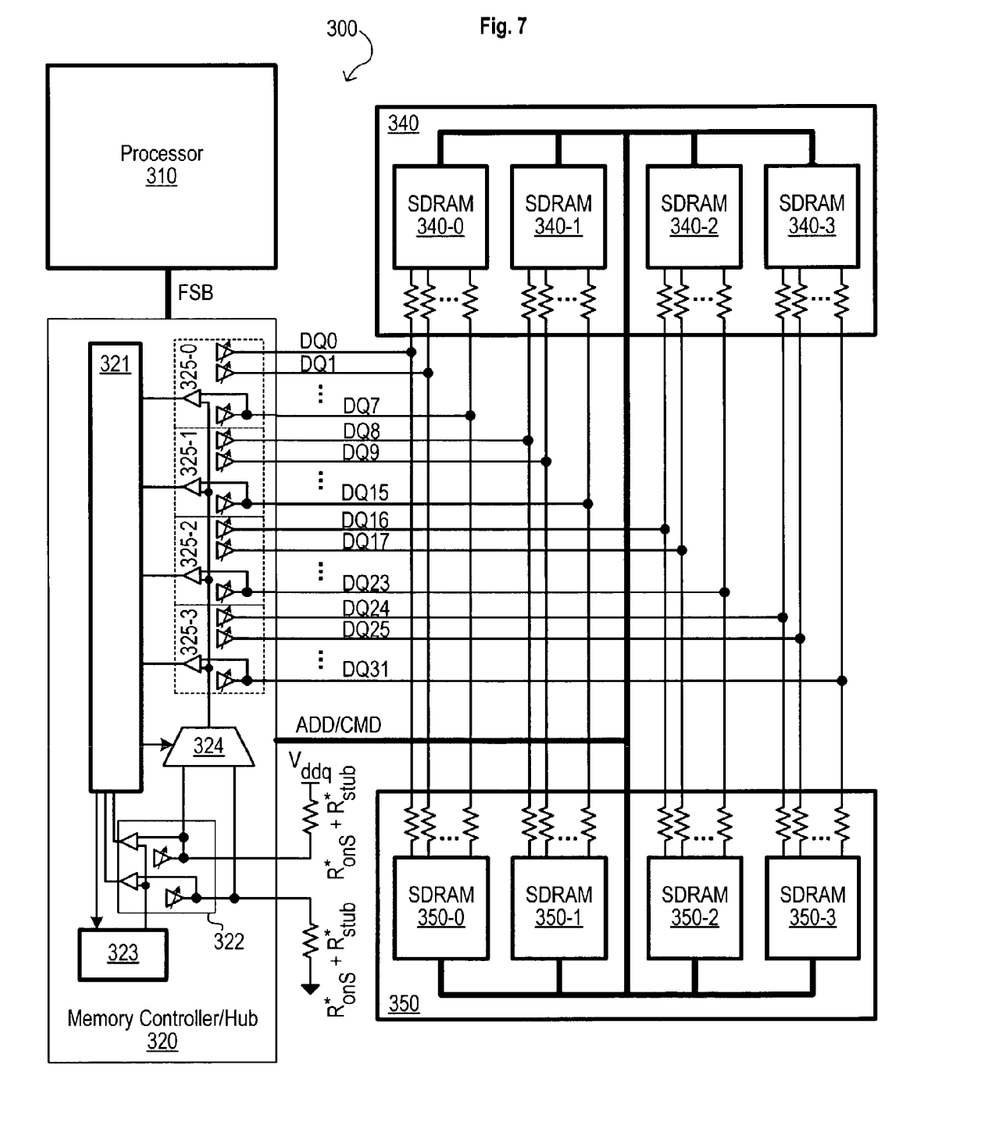
FIG. 7 shows a memory controller according to some embodiments of the invention, connected in a system with a processor and two DIMM (Dual In-line Memory Module) cards.

FIG. 7 shows a computer system embodiment 300 with master calibration circuitry integrated into a memory controller/hub (MCH) 320. A processor 310 communicates with MCH 320 over a frontside bus FSB. MCH 320 also communicates with DDRII SDRAM devices located on two DIMM cards (DIMM card 340 and DIMM card 350). As shown, each DIMM card contains four SDRAM devices—devices 340-0, 340-1, 340-2, and 340-3 for DIMM card 340, and devices 350-0, 350-1, 350-2, and 350-3 for DIMM card 350. Each SDRAM device receives address and command data from MCH 320 over bus ADD/CMD. When a memory transaction is addressed to the devices on a particular DIMM, those devices receive signals (for writes) or drive signals (for reads) on data lines DQ0-31. Each SDRAM handles one byte of the four-byte data bus (this division is merely exemplary—different size data buses, and different numbers of data lines/SDRAM would function similarly). Each DIMM connects the appropriate SDRAM devices to the data lines through stub resistors.

MCH 320 contains one calibration state machine 321, one reference driver 322 (actually consisting of separate pull-up and pull-down reference drivers), one reference calibration circuit 323, and one reference multiplexer 324. Four I/O driver blocks, 325-0 through—3, connect respectively to the four bytes of data lines.

Consider I/O driver block 325-0 as exemplary. Driver block 325-0 attaches to data lines DQ0 through DQ7, with one separate I/O driver for each DQ line. Each I/O driver in block 325-0 has an adjustable impedance, but all drivers share the same impedance control register value. Block 325-0 also contains a comparator that compares the voltage on DQ7 to the output voltage of reference multiplexer 324 and supplies a result to calibration state machine 321.

Now consider calibration of the drivers on SDRAM devices 34-0 through —3. MCH 320 first calibrates its reference driver 322 using reference calibration circuit 323 and two external resistors, each having a resistance equal to the DIMM stub resistance added to the nominal slave driver on-impedance. Calibration state machine duplicates the calibrated reference driver impedance to each master I/O driver in I/O driver blocks 325-0 through -3.

Memory controller hub 320 then selects DIMM 340 and places the devices on that DIMM in OCD impedance adjustment protocol mode. MCH 320 instructs SDRAM devices 340-0 through —3 to attempt to drive DQ0-31 high. Concurrently, the master drivers connecting to DQ7, DQ15, DQ23, and DQ31 are driven low, and four separate calibration match signals are generated and analyzed by calibration state machine 321.

A method such as that depicted in FIG. 6 is then used to adjust the slave driver impedance for the SDRAM devices on DIMM 340. It is possible that each SDRAM device on DIMM 340 has a different impedance setting that produces the best calibration result. Therefore, during calibration each device may receive impedance adjustment commands different from those received by the other devices.

Although hardware implementations of the described embodiments have been described, those skilled in the art will recognize that at least some parts of the master/slave calibration process, as described, are amenable to software, and/or firmware, implementation. For instance, overall calibration sequencing and timing instructions could be stored as part of a system BIOS, to be read and executed by processor 310, in cooperation with MCH 320, at system startup. MCH 320 can also contain firmware to perform such functions autonomously.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. For instance, the reference impedance used to calibrate the master reference driver will typically be a precision resistor located on a circuit board to which the master circuit attaches, but other locations and/or impedance references could be selected. The comparator used to compare the master driver voltage to the master reference driver voltage could also be used as a data receiver, with the receive comparison voltage multiplexed into the comparator instead of the reference driver voltage during receive operations. A master reference driver could also be used to calibrate terminated data line systems, by using a reference impedance that emulates the terminated data line impedance.

Although not shown in the drawings, On-Die Termination (ODT) of data lines can exist in some embodiments. Typically, the ODT circuitry would be turned off during driver calibration (although this type of circuit could also be used to calibrate an ODT circuit).

As used herein, references to the "master" device merely infer that the device serves as a load for calibrating a "slave" device driver. Although the master is shown as having the calibration state machine, some—or most—of this logic could be located in the slave device, or in a third device in a given system. As the term "bus" is used herein, the term refers generally to electrical interconnects. A bus can be serial, parallel, differential, single-ended, etc. A bus can be a conventional multidrop bus, or a point-to-point bus comprising multiple separate bus segments. In a point-to-point bus, some devices could function as a master on some bus segments and as a slave on other bus segments.

The reference calibration circuit is shown integrated with the master circuit. That circuit could reside partially—or wholly—separate from the master circuit. Such minor modifications are encompassed within the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A circuit, comprising:
   a bi-directional data bus;
   a master I/O driver coupled to a data line of the bi-directional data bus and having a plurality of selectable on-impedance values;
   a reference voltage generator configured to generate a reference voltage including;
     at least one reference impedance; and
     at least one reference driver, each reference driver coupled to a corresponding reference impedance through a reference node, and configured to generate a driver reference voltage on the reference node;
     wherein the reference voltage generator is configured to provide one of the driver reference voltages as the reference voltage;
   a calibration comparator coupled to the master I/O driver and the reference voltage generator, and configured to compare the reference voltage and a voltage on an output of the master I/O driver to generate a calibration comparison;
   off-chip driver impedance adjustment circuitry configured to generate an impedance adjustment signal in response to the calibration comparison;
   a slave I/O driver coupled to the data line and having a plurality of selectable on-impedance values; and
   slave impedance adjustment circuitry coupled to the slave I/O driver, and configured to select an on-impedance value for the slave I/O driver in response to the impedance adjustment signal.

2. The circuit of claim 1, wherein the reference voltage generator further comprises:
   a reference calibration circuit configured to generate at least one reference calibration voltage; and
   a reference comparator coupled to the reference calibration circuit and configured to compare a selected one of the reference calibration voltages to the reference voltage to generate a reference calibration comparison.

3. The circuit of claim 2, further comprising:
   reference impedance adjustment circuitry coupled to the reference drivers and configured to adjust an on-impedance of at least one of the reference drivers in response to the reference calibration comparison.

4. The circuit of claim 2, wherein the reference calibration circuit further comprises:
   a first calibration impedance coupled between a first node and a second node;
   a second calibration impedance coupled between the second node and a third node; and
   a plurality of switching transistors coupled to the first node and the third node, and configured to selectively couple the first node to a power supply and the third node to a ground in a first state, and couple the first node to the ground and the third node to the power supply in a second state;
   wherein the second node is coupled to the reference comparator.

5. The circuit of claim 4, wherein:
   the first calibration impedance is substantially proportional to an on-impedance of the master I/O driver; and
   the second calibration impedance is substantially proportional to a sum of an on-impedance of the slave I/O driver and a stub impedance.

6. The circuit of claim 1, wherein the reference voltage generator further comprises:
   a first reference impedence;
   a second reference impedance;
   a first reference driver coupled to the first reference impedance and configured to generate a first driver reference voltage using the first reference impedance;
   a second reference driver coupled to the second reference impedance and configured to generate a first driver reference voltage using the first reference impedance; and
   a multiplexer coupled to the first reference driver, the second reference driver, and the calibration comparator, and configured to select one of the first driver reference voltage and the second driver reference voltage as the reference voltage.

7. The circuit of claim 6, wherein the reference voltage generator further comprises:
   a reference calibration circuit configured to selectively generate a first reference calibration voltage or a second reference calibration voltage; and
   a reference comparator coupled to the reference calibration circuit and configured to compare a selected reference calibration voltage to the reference voltage.

8. The circuit of claim 1, further comprising a discrete stub impedance coupled between the slave I/O driver and the data line, wherein the reference impedance is substantially equal to the sum of the discrete stub impedance and a nominal slave driver on-impedance.

9. The circuit of claim 1, wherein the impedance adjustment signal is transmitted, at least in part, over the data line.

10. The circuit of claim 1, further comprising:
    a second slave I/O driver connectable to the data line, the second slave I/O driver having a plurality of selectable on-impedance values;
    second slave impedance adjustment circuitry coupled to the second slave I/O driver and configured to select an on-impedance for the second slave I/O driver in response to the impedance adjustment signal; and slave I/O driver selection circuitry for selecting one of the first slave I/O driver and the second slave I/O driver for connection to the data line to calibrate the selected slave I/O driver.

11. The circuit of claim 10, wherein:

the master I/O driver is part of a memory controller;

the first slave I/O driver is part of a first memory device of a common memory module; and the second slave I/O driver is part of a second memory device of the common memory module.

12. The circuit of claim 6, further comprising:

a calibration state machine coupled to the reference calibration circuit and the multiplexer, and configured to generate a selection signal;

wherein:

the multiplexer is configured to select the first driver reference voltage as the reference voltage when the selection signal is in a first state, and configured to select the second driver reference voltage as the reference voltage when the selection signal is in a second state; and the reference calibration circuit is further configured to generate a pull down reference calibration voltage when the selection signal is in a first state, and configured to generate a pull up reference calibration voltage when the selection signal is in a second state.

13. The circuit of claim 12, wherein the reference calibration circuit further comprises:

an inverter configured to invert the selection signal;

a first transistor having a source coupled to a power supply, a drain coupled to a first node, and a gate configured to receive the selection signal;

a second transistor having a source coupled to a power supply, a drain coupled to a second node, and a gate configured to receive the inverted selection signal;

a third transistor having a drain coupled to the first node, a source coupled to a ground, and a gate configured to receive the selection signal;

a fourth transistor having a drain coupled to the second node, a source coupled to a ground, and a gate configured to receive the inverted selection signal;

a first calibration impedance coupled between the first node and a third node; and a second calibration impedance coupled between the second node and the third node.

14. The circuit of claim 13, wherein:

the first calibration impedance is substantially proportional to an impedance of the master I/O driver;

the second calibration impedance is substantially proportional to a sum of an impedance of the slave I/O driver and a stub impedance; and the first and second reference impedances are substantially equal to the sum of the impedance of the slave I/O driver and the stub impedance.

* * * * *